US00RE45270E

(19) United States
(12) Reissued Patent
Lee et al.

(10) Patent Number: US RE45,270 E
(45) Date of Reissued Patent: Dec. 2, 2014

(54) METHOD FOR TRANSMITTING UPLINK SIGNALS

(71) Applicant: LG Electronics Inc., Seoul (KR)

(72) Inventors: Dae Won Lee, Anyang-si (KR); Ki Jun Kim, Anyang-si (KR); Joon Kui Ahn, Anyang-si (KR)

(73) Assignee: LG Electronics Inc., Seoul (KR)

(21) Appl. No.: 14/068,813

(22) Filed: Oct. 31, 2013

Related U.S. Patent Documents

Reissue of:
(64) Patent No.: 8,050,227
Issued: Nov. 1, 2011
Appl. No.: 12/457,902
Filed: Jun. 24, 2009

U.S. Applications:
(60) Provisional application No. 61/075,322, filed on Jun. 24, 2008, provisional application No. 61/087,992, filed on Aug. 11, 2008, provisional application No. 61/099,206, filed on Sep. 23, 2008.

(30) Foreign Application Priority Data

Jun. 5, 2009 (KR) ..... 10-2009-049805

(51) Int. Cl.
*H04W 72/02* (2009.01)

(52) U.S. Cl.
USPC ..... 370/329; 370/437

(58) Field of Classification Search
None
See application file for complete search history.

(56) References Cited

U.S. PATENT DOCUMENTS

| | | | | |
|---|---|---|---|---|
| 2007/0206561 | A1 | 9/2007 | Son et al. | |
| 2008/0102846 | A1 | 5/2008 | Kim et al. | |
| 2008/0200196 | A1* | 8/2008 | Muharemovic et al. | 455/512 |
| 2009/0103482 | A1 | 4/2009 | Imamura et al. | |
| 2010/0002664 | A1* | 1/2010 | Pan et al. | 370/338 |
| 2010/0192035 | A1* | 7/2010 | Sagfors et al. | 714/748 |

FOREIGN PATENT DOCUMENTS

| | | | |
|---|---|---|---|
| EP | 2 037 616 | | 3/2009 |
| KR | 10-2008-0029734 | | 4/2008 |
| KR | 10-2008-0029734 | A | 4/2008 |
| KR | 10-0910707 | | 4/2008 |
| KR | 10-2008-0109579 | | 12/2008 |
| KR | 10-2008-0109579 | A | 12/2008 |

(Continued)

OTHER PUBLICATIONS

Nokia Siemens Networks et al: "ACK/NACK Budnling Details for LTE TDD" 3GPP Draft; R1-081858, 3rd Generation Partnership Project (3GPP), vol. RAN WG1, XP0501 10226, May 2008.

(Continued)

*Primary Examiner* — Alex Skripnikov
(74) *Attorney, Agent, or Firm* — Mckenna Long & Aldridge LLP

(57) ABSTRACT

A method of transmitting uplink signals is disclosed. The method includes transmitting, by a user equipment, periodic control information on a Physical Uplink Control Channel (PUCCH) at a predetermined period, dropping the periodic control information and multiplexing uplink signals except the periodic control information when the user equipment is operating in subframe bundling transmission mode where the uplink signals are transmitted in a plurality of consecutive subframes, and transmitting the multiplexed uplink signals on a Physical Uplink Shared Channel (PUSCH).

8 Claims, 13 Drawing Sheets

(56) References Cited

FOREIGN PATENT DOCUMENTS

| | | | |
|---|---|---|---|
| KR | 10-2008-0035437 | A | 4/2009 |
| WO | 2007/087842 | A1 | 8/2007 |
| WO | WO 2007/087842 | | 8/2007 |
| WO | 2008/057843 | A2 | 5/2008 |

OTHER PUBLICATIONS

"3rd Generation Partnership Project; Technical Specification Group Radio Access Network Evolved Universal Terrestrial Radio Access (E-UTRA); Physical layer procedures (Release 8)" 3rd Generation Partnership Project (3GPP); Technical Specification (TS),, No. 3GPP TS 36.213 V8.3.0, May 1, 2004 (May 1, 2008), pp. 1-45, XP003023100.

Alcatel-Lucent: "Implications of Solutions for Subframe Bundiling" 3GPP Draft; R1-080914, 3rd Generation Partnership Project (3GPP), vol. RAN WG1, XP050109387, Feb. 2008.

Alcatel-Lucent: "Multiplexing the Scheduling Request in the Uplink" 3GPP Draft; R1-073066, 3rd Generation Partnership Project (3GPP), vol. RAN WG1, XP050106721, Jun. 2007.

Nokia Siemens Networks et al: "Multiplexing of Scheduling Request and ACK/NACK and/or CQI" 3GPP Draft; R1-073011, 3rd Generation Partnership Project (3GPP), vol. RAN WG1, XP050106675, Jun. 2007.

Ericsson: "Details of ACK/NAK bundiling for TDD" 3GPP Draft; R1-082002, 3rd Generation Partnership Project (3GPP), vol. RAN WG1, XP050110349, May 2008.

LG Electronics: "Subframe bundling issue for CQI transmission in PUSCH" 3GPP Draft; R1-082921, 3rd Generation Partnership Project (3GPP), XP050316390, Aug. 2008.

Interdigital Communications et al: "Uplink control information multiplexing in TTI bundling mode and Draft CR" 3GPP Draft; R1-083897, 3rd Generation Partnership Project (3GPP), XP050317208, Oct. 2008.

Ericsson: "TTI bundling" 3GPP Draft; R1-084368, 3rd Generation Partnership Project (3GPP), XP050317637, Nov. 2008.

* cited by examiner

METHOD FOR TRANSMITTING UPLINK SIGNALS

Matter enclosed in heavy brackets [ ] appears in the original patent but forms no part of this reissue specification; matter printed in italics indicates the additions made by reissue.

This application claims the benefit of Korean Patent Application No. 10-2009-0049805, filed on Jun. 5, 2009, which is hereby incorporated by reference as if fully set forth herein.

This application also claims the benefit of U.S. Provisional Application Ser. Nos. 61/075,322, filed on Jun. 24, 2008, 61/087,992, filed on Aug. 11, 2008, and 61/099,206, filed on Sep. 23, 2008 the contents of which are hereby incorporated by reference herein in their entirety.

BACKGROUND OF THE INVENTION

1. Field of the Invention

The present invention relates to a mobile communication technology, and more particularly, to a method for transmitting uplink signals.

2. Discussion of the Related Art

In a mobile communication system, a User Equipment (UE) may receive information from an evolved Node B (eNB) on a downlink and transmit information to the eNB on an uplink. The UE transmits or receives data and various pieces of control information. There are many physical channels depending on the types and usages of the transmitted or received information.

FIG. 1 illustrates physical channels used in a mobile communication system, for example, a $3^{rd}$ Generation Partnership Project (3GPP) Long Term Evolution (LTE) system and a general signal transmission method using the physical channels.

Referring to FIG. 1, upon power-on or when a UE initially enters a cell, the UE performs an initial cell search involving synchronization of its timing to an eNB in step S101. For the initial cell search, the UE may be synchronized to the eNB and acquire information such as a cell Identifier (ID) by receiving a Primary Synchronization CHannel (P-SCH) and a Secondary Synchronization CHannel (S-SCH). Then the UE may receive broadcast information from the cell on a Physical Broadcast CHannel (PBCH). In the mean time, the UE may determine a downlink channel status by receiving a Down-Link Reference Signal (DL RS) during the initial cell search.

After the initial cell search, the UE may acquire more specific system information by receiving a Physical Downlink Control CHannel (PDCCH) and receiving a Physical Downlink Shared CHannel (PDSCH) based on information of the PDCCH in step S102.

On the other hand, if the UE has not completed connection to the eNB, it may perform a random access procedure to complete the connection in steps S103 to S106. For the random access, the UE may transmit a predetermined sequence as a preamble to the eNB on a Physical Random Access CHannel (PRACH) in step S103 and receive a response message for the random access on a PDCCH and a PDSCH corresponding to the PDCCH in step S104. In the case of contention-based random access other than handover, the UE may perform a contention resolution procedure by further transmitting the PRACH in step S105 and receiving a PDCCH and its related PDSCH in step S106.

After the foregoing procedure, the UE may receive a PDCCH and a PDSCH in step S107 and transmit a Physical Uplink Shared CHannel (PUSCH) and a Physical Uplink Control CHannel (PUCCH) in step S108, in a general downlink/uplink signal transmission procedure.

FIG. 2 is a block diagram of the UE for processing an uplink signal for transmission.

Referring to FIG. 2, a scrambler 201 of the UE may scramble a transmission signal with a UE-specific scrambling signal in order to transmit the uplink signal. A modulation mapper 202 modulates the scrambled signal to complex symbols in Binary Phase Shift Keying (BPSK), Quadrature Phase Shift Keying (QPSK), or 16-ary Quadrature Amplitude Modulation (16QAM) according to the type of the transmission signal and/or a channel status. A transform precoder 203 processes the complex symbols and a resource element mapper 204 may map the processed complex symbols to time-frequency resource elements, for actual transmission. The mapped signal may be transmitted to the eNB through an antenna after being processed in a Single Carrier-Frequency Division Multiple Access (SC-FDMA) signal generator 205.

FIG. 3 is a block diagram of the eNB for processing a downlink signal for transmission.

Referring to FIG. 3, in the 3GPP LTE system, the eNB may transmit one or more codewords on the downlink. Therefore, the one or more codewords may be processed to complex symbols through scramblers 301 and modulation mappers 302 in the same manner as for the uplink transmission illustrated in FIG. 2. A layer mapper 303 maps the complex symbols to a plurality of layers. A precoder 304 may multiply the layers by a precoding matrix selected according to a channel status and allocate the multiplied layers to respective antennas. Resource element mappers 305 may map the transmission signals for the respective antennas to time-frequency resource elements. The mapped signals may be transmitted through the respective antennas after being processed in Orthogonal Frequency Division Multiple Access (OFDMA) signal generators 306.

In the mobile communication system, Peak-to-Average Ratio (PAPR) may be more problematic for uplink transmission from the UE than for downlink transmission from the eNB. That's why the uplink signal transmission is carried out in SC-FDMA, while OFDMA is employed for the downlink signal transmission, as described above with reference to FIGS. 2 and 3.

FIG. 4 is a block diagram illustrating SC-FDMA for uplink signal transmission and OFDMA for downlink signal transmission in the mobile communication system.

Referring to FIG. 4, the UE and the eNB commonly have a Serial-to-Parallel Converter (SPC) 401, a subcarrier mapper 403, an M-point Inverse Discrete Fourier Transform (IDFT) processor 404, and a Parallel-to-Serial Converter (PSC) 405, for uplink and downlink signal transmissions, respectively. In addition to these components, the UE further includes an N-point Discrete Fourier Transform (DFT) processor 402 for transmitting a signal in SC-FDMA, such that the transmission signal takes single-carrier characteristics by canceling the effects of the IDFT of the M-point IDFT processor 404 to some degree.

In the above-described mobile communication system, the UE transmits uplink control information in a predetermined frequency band different from that of uplink data. The uplink control information transmission may be implemented in various manners. Some control information may be transmitted periodically at a predetermined interval, whereas other control information may be transmitted non-periodically upon request of the eNB.

If the UE transmits data and control information simultaneously, a certain process is required to maintain the aforementioned SC-FDMA characteristics in the mobile communication system.

SUMMARY OF THE INVENTION

Accordingly, the present invention is directed to a method for transmitting uplink signals that substantially obviates one or more problems due to limitations and disadvantages of the related art.

An object of the present invention is to provide a method for overcoming problems encountered with simultaneous occurrence of control information transmission and data transmission from a UE.

Another object of the present invention is to provide a method for processing uplink control information, when a UE operates in subframe bundling transmission mode.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of transmitting uplink signals includes transmitting, by a user equipment, periodic control information on a Physical Uplink Control Channel (PUCCH) at a predetermined period, dropping the periodic control information and multiplexing uplink signals except the periodic control information when the user equipment is operating in subframe bundling transmission mode where the uplink signals are transmitted in a plurality of consecutive subframes, and transmitting the multiplexed uplink signals on a Physical Uplink Shared Channel (PUSCH).

The plurality of the consecutive subframes may be 4 subframes.

The periodic control information may include at least one of a Channel Quality Indication (CQI), a Precoding Matrix Index (PMI) and a Rank Indication (RI).

The method may further include inserting Acknowledgment/Negative Acknowledgement (ACK/NACK) information by puncturing the multiplexed uplink signals, when the user equipment is operating in the subframe bundling transmission mode where the uplink signals are transmitted in the plurality of consecutive subframes.

In another aspect of the present invention, a user equipment includes a Radio Frequency (RF) unit, a processing unit operably connected to the RF unit, and a memory unit operably connected to the processing unit. The processing unit transmits a periodic control signal through the RF unit on a Physical Uplink Control Channel (PUCCH) at a predetermined period, and when the user equipment is operating in subframe bundling transmission mode where data stored in the memory unit are transmitted in a plurality of consecutive subframes, the processing unit drops the periodic control signal, multiplexes the data except the periodic control signal, and transmits the multiplexed data on a Physical Uplink Shared Channel (PUSCH).

The plurality of the consecutive subframes may be 4 subframes.

The periodic control information may include at least one of a Channel Quality Indication (CQI), a Precoding Matrix Index (PMI) and a Rank Indication (RI).

The processing unit may insert Acknowledgment/Negative Acknowledgement (ACK/NACK) information by puncturing the multiplexed data, when the user equipment is operating in the subframe bundling transmission mode where the data stored in the memory unit are transmitted in the plurality of consecutive subframes.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

In a mobile communication system, a UE transmits a variety of pieces of information on an uplink. Uplink information transmitted by the UE may be largely divided into data and control information. The control information includes an ACKnowledgment/Negative ACKnowledgment (ACK/NACK), Channel Quality Indication/Precoding Matrix Indicator (CQI/PMI) and a Rank Indication (RI).

Figure 1:
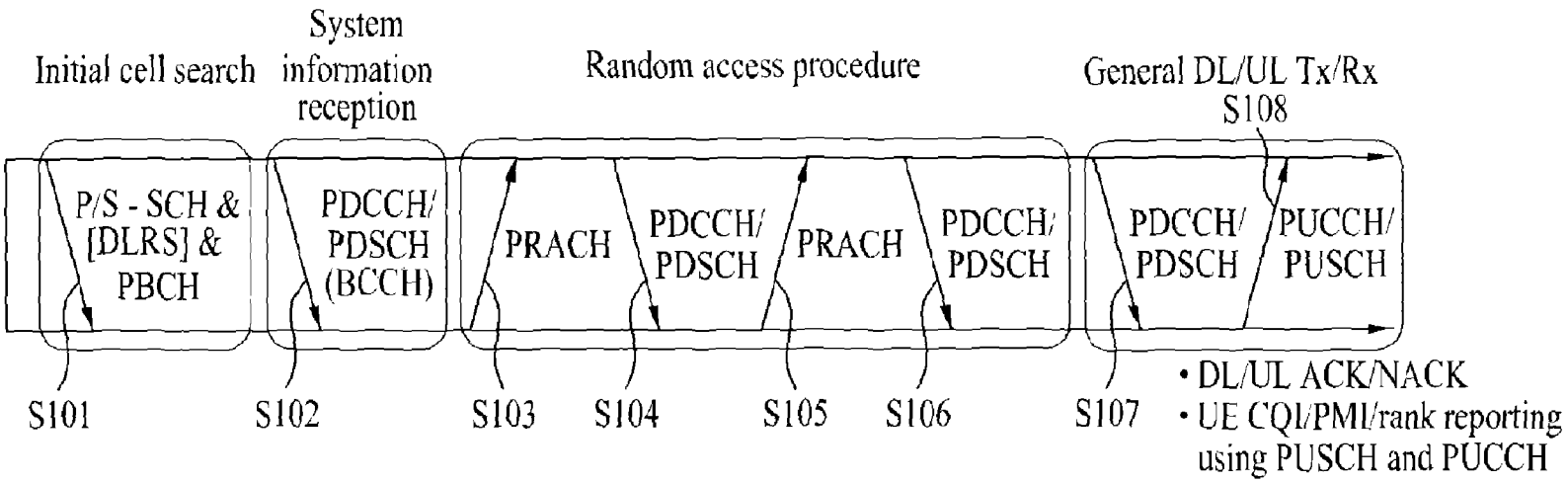
FIG. 1 PRIOR ART
FIG. 1 illustrates physical channels used in a mobile communication system, for example, a 3rd Generation Partnership Project (3GPP) Long Term Evolution (LTE) system and a general signal transmission method using the physical channels.
Figure 2:
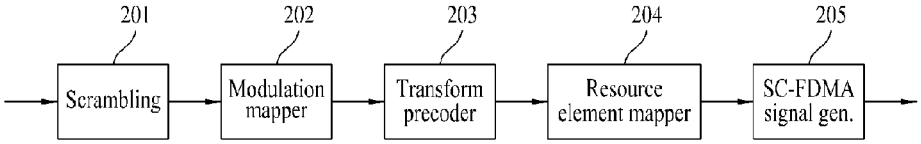
FIG. 2 PRIOR ART
FIG. 2 is a block diagram of a User Equipment (UE) for processing an uplink signal for transmission.
Figure 3:
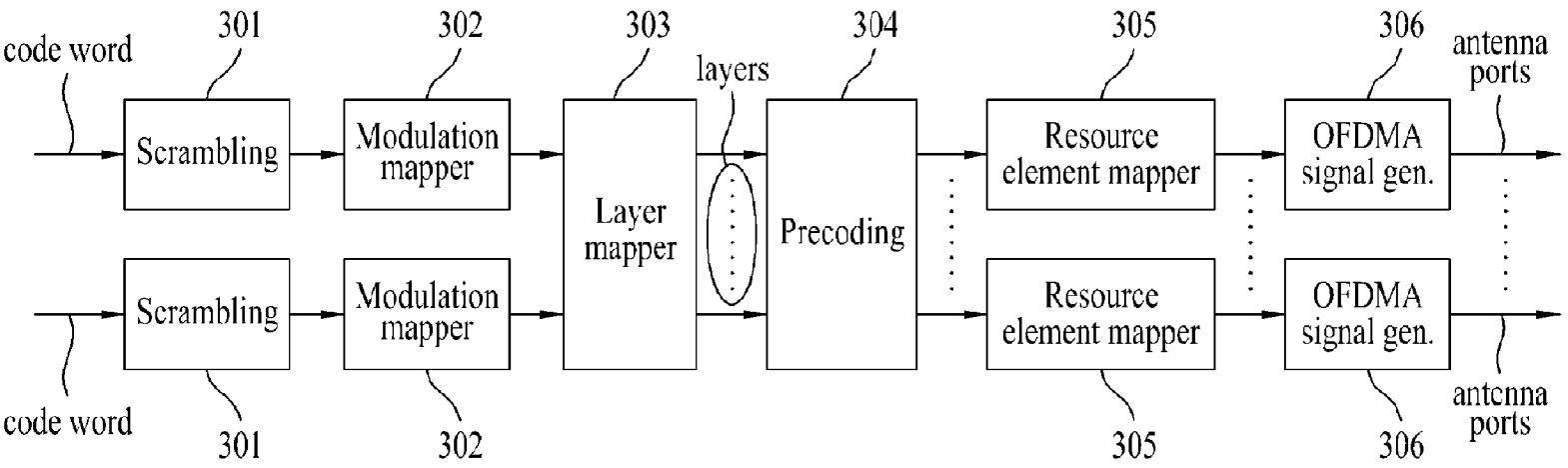
FIG. 3 PRIOR ART
FIG. 3 is a block diagram of an enhanced Node B (eNB) for processing a downlink signal for transmission.
Figure 4:
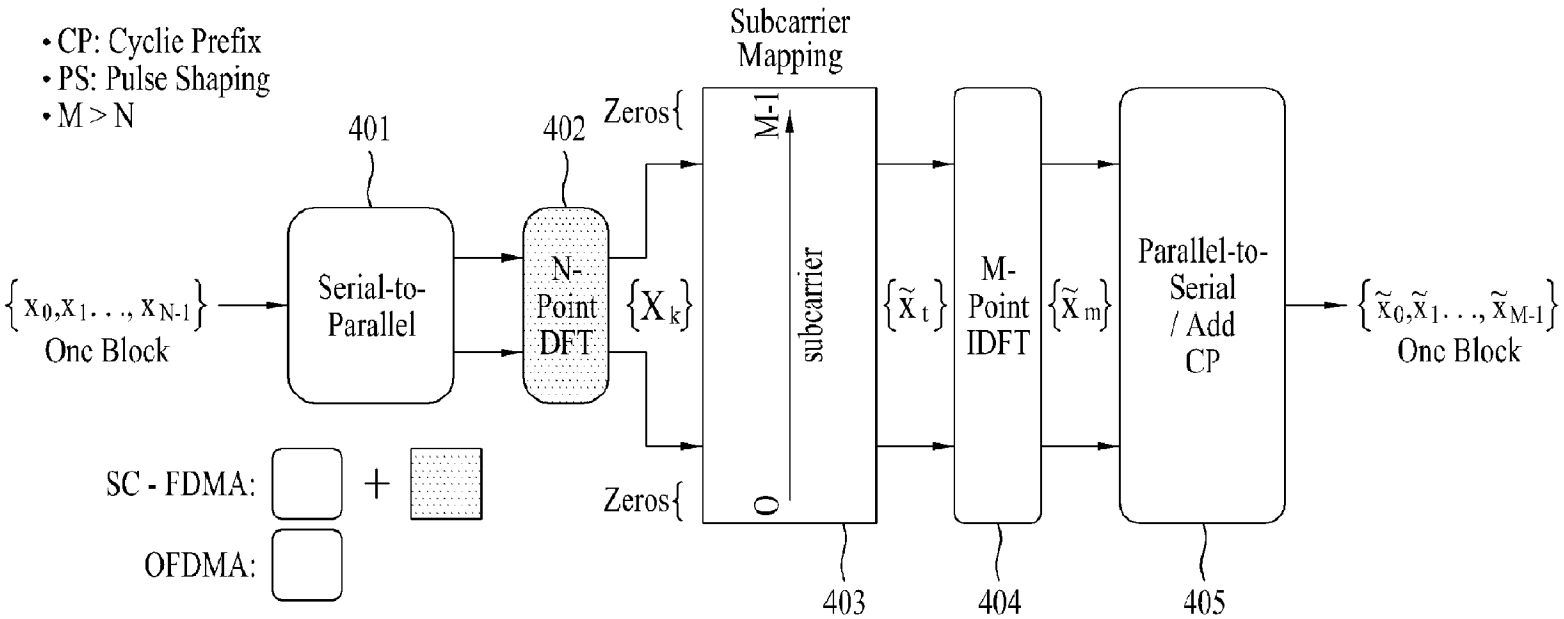
FIG. 4 PRIOR ART
FIG. 4 is a block diagram illustrating Single-Carrier-Frequency Division Multiple Access (SC-FDMA) for uplink signal transmission and Orthogonal Frequency Division Multiple Access (OFDMA) for downlink signal transmission in the mobile communication system.
Figure 5:
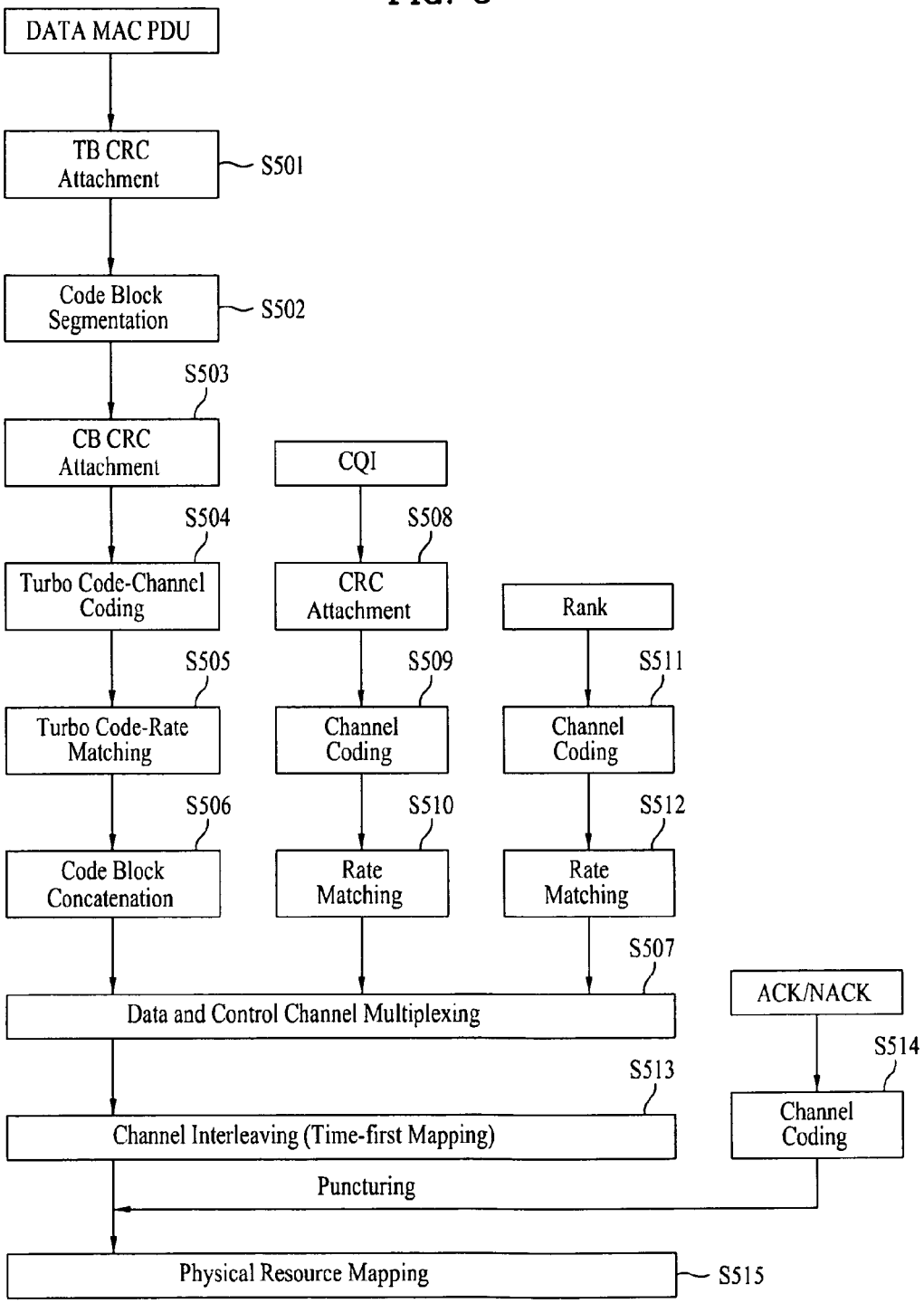
FIG. 5 illustrates an operation for multiplexing data with control information, for uplink signal transmission.

FIG. 5 illustrates an operation for multiplexing data with control information, for uplink signal transmission.

Referring to FIG. 5, a Transport Block (TB) Cyclic Redundancy Check (CRC) is attached to a TB of data to be multiplexed with control information in step S501. In step S502, the CRC-attached data is segmented into a plurality of Code Blocks (CBs) according to the size of the TB. A CB CRC is attached to each of the CBs in step S503 and the CRC-attached CBs are channel-encoded in step S504. The channel-encoded CBs are rate-matched in step S505 and then concatenated in step S506. The concatenated CBs are multiplexed with a control signal in step S507.

Meanwhile, a CQI/PMI is attached with a CRC in step S508 and channel-encoded, separately from the data in step S509. After rate matching in step S510, the channel-encoded CQI/PMI is multiplexed with the data in step S507.

An RI is also channel-encoded, separately from the data in step S511. After rate matching in step S512, the channel-coded RI is multiplexed with the data in step S507.

In step S513, the multiplexed data, CQI/PMI, and RI are channel-interleaved.

ACK/NACK information is channel-encoded separately from the data, the CQI/PMI, and the RI in step S514. The channel-encoded ACK/NACK information is inserted in part of the interleaved signal by puncturing or the like and the interleaved signal with the ACK/NACK information is mapped to physical resources in step S515, prior to transmission on the uplink.

Figure 6:
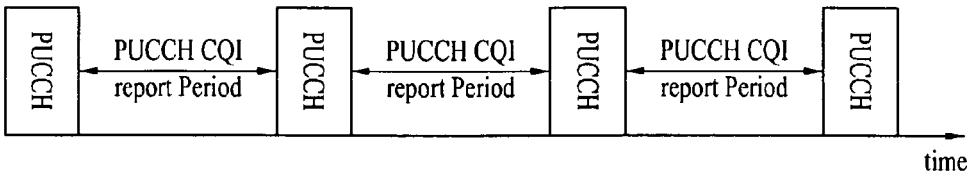
FIG. 6 illustrates periodic transmission of an uplink Channel Quality Indication (CQI) at a predetermined interval on a Physical Uplink Control CHannel (PUCCH).

FIG. 6 illustrates periodic transmission of an uplink CQI on a Physical Uplink Control CHannel (PUCCH) at a predetermined interval. When the UE is set to transmit a CQI periodically on the uplink, it transmits the CQI on the uplink periodically on a PUCCH, as illustrated in FIG. 6. This CQI that is transmitted periodically on the uplink is called a periodic CQI.

Figure 7:
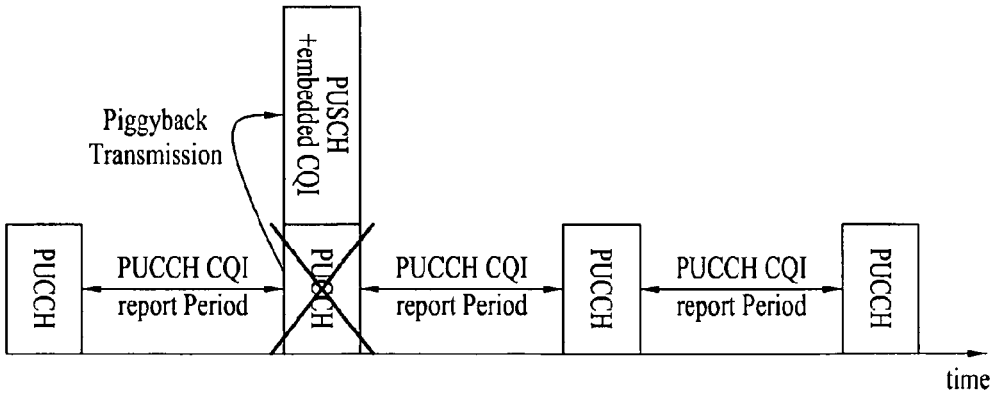
FIG. 7 illustrates a signal processing operation when periodic CQI transmission and data transmission are concurrent.

FIG. 7 illustrates a signal processing operation when a periodic CQI and data are transmitted simultaneously. Referring to FIG. 7, when transmission of a periodic CQI on a PUCCH is simultaneous with transmission of data on a Physical Uplink Shared CHannel (PUSCH), the periodic CQI is embedded in the PUSCH and transmitted in a piggyback manner. While FIG. 7 has been described in the context of a periodic CQI, an RI may be transmitted on the uplink in the same manner, when the RI is transmitted periodically.

While one subframe is taken to transmit data on a PUSCH in the illustrated case of FIG. 7, the uplink data may occupy a predetermined number of consecutive subframes along the time axis on the PUSCH to expand coverage for UEs at a cell boundary. The transmission of the same data in a predetermined number of consecutive subframes is called subframe bundling in 3GPP LTE.

For a UE that is set to transmit data by subframe bundling, that is, for a UE that operates in subframe bundling transmission mode, how to process control information becomes an issue to be handled, in the case where the data and the control information are to be transmitted simultaneously.

Two types of control information are transmittable together with data on the uplink. The two types of control information may be uplink ACK/NACK information being a response signal for downlink data, and the other control information. ACK/NACK information is transmitted only when downlink data exists. Since a UE which does not receive downlink data cannot transmit uplink ACK/NACK information, uplink ACK/NACK information should not have influence on the other control information. Hence, the two types of control information are distinguished from each other, for transmission together with data on the uplink.

Hereinafter, to make a distinction between ACK/NACK information and the other control information, it is assumed that the term "control information" indicates a control signal other than an ACK/NACK signal and the term "ACK/NACK signal" is used to indicate the ACK/NACK signal. In an exemplary embodiment of the present invention, a control signal may include at least one of a CQI/PMI and an RI.

On the uplink, data may be transmitted together with control information, or together with control information and ACK/NACK information, or together with ACK/NACK information.

Herein, control information is categorized into periodic control information and non-periodic control information. The periodic control information refers to control information that the UE periodically transmits to the eNB, and the non-periodic control information refers to control information that the UE non-periodically transmits to the eNB under approval of the eNB. Each of the periodic control information and the non-periodic control information may include at least one of a CQI/PMI and an RI.

Figure 8:
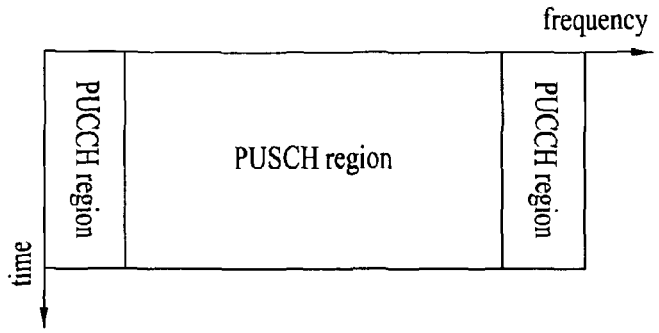
FIG. 8 illustrates a subframe referred to for describing periodic control information.

Now a description will be made of a method for processing control information, in the case where data is transmitted on a PUSCH by subframe bundling and the data transmission is concurrent with transmission of the control information. FIG. 8 illustrates a subframe referred to for describing periodic control information. Referring to FIG. 8, the subframe is divided into a PUSCH region and PUCCH regions.

The eNB may set the UE to transmit control information periodically at a predetermined interval. In this case, the UE transmits a CQI/PMI or an RI in a predetermined subframe periodically. In the absence of transmission data at a time for transmission of periodic control information, the UE transmits the periodic control information on a PUCCH on the uplink. On the other hand, in the presence of transmission data at a time for transmission of periodic control information, the UE multiplexes the periodic control information with the data and transmits the multiplexed signal on a PUSCH on the uplink.

Uplink transmission of non-periodic control information is triggered by an uplink scheduling grant that the eNB transmits to the UE on a PDCCH. The uplink scheduling grant provides the UE with a plurality of pieces of information including information about a particular frequency and allocated resources blocks in a PUSCH region, for transmission of data or the non-periodic control information.

The non-periodic control information may be transmitted only on the PUSCH. Also, the transmission of the non-periodic control information is implemented only when the eNB approves it by an uplink scheduling grant.

Figure 9:
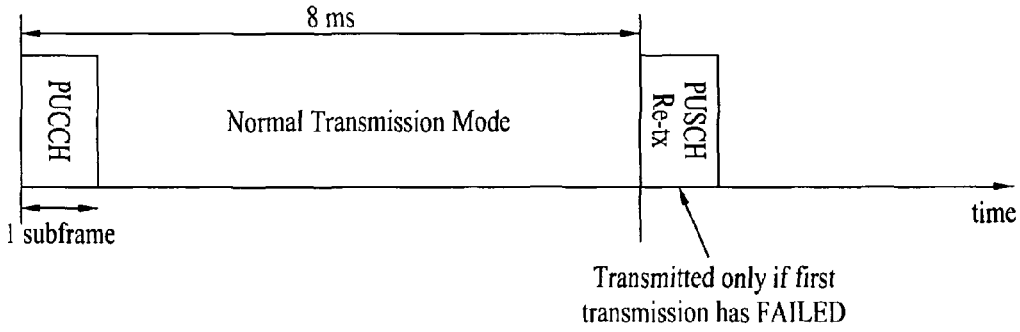
FIGS. 9 and 10 illustrate a subframe transmission scheme in normal transmission mode.
Figure 10:
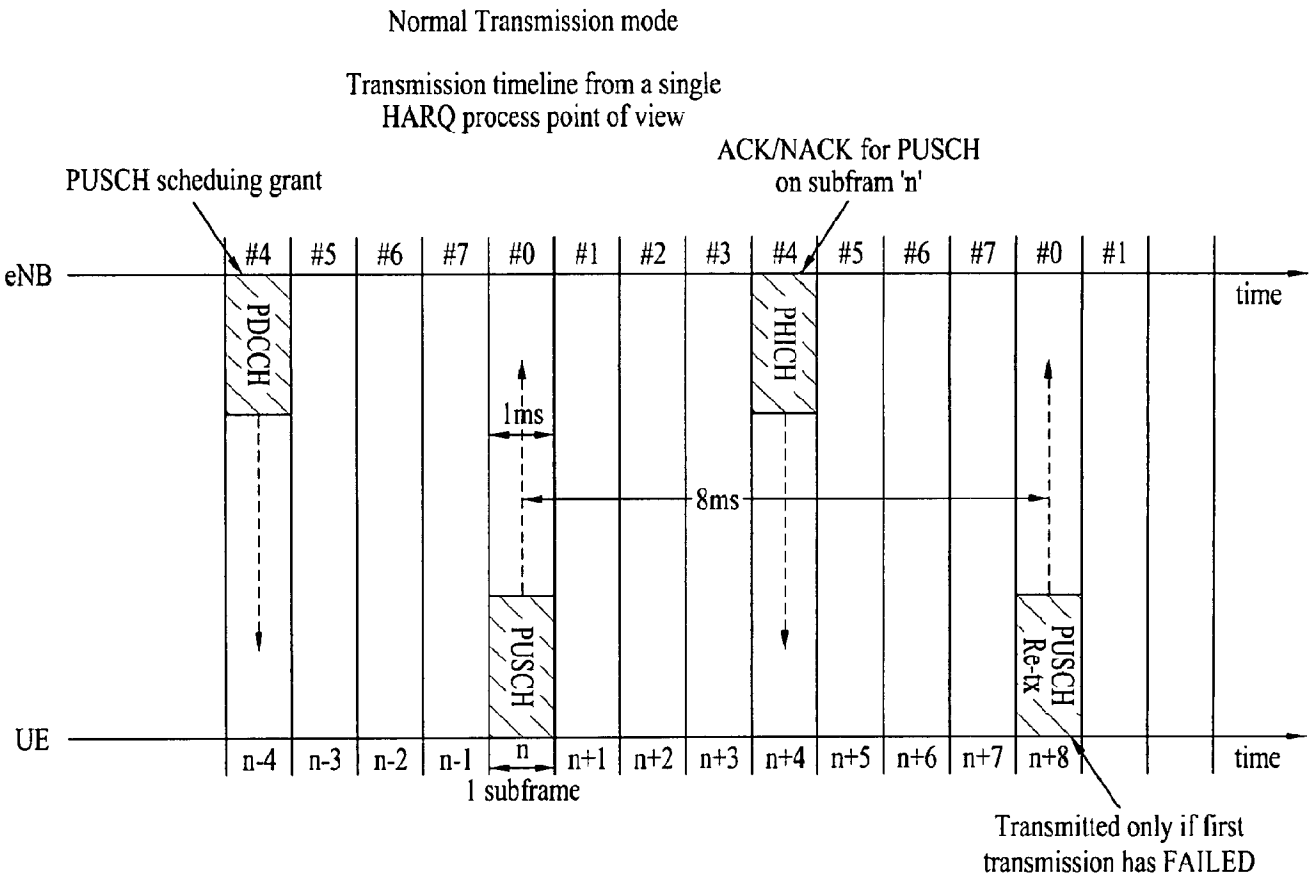

FIGS. 9 and 10 illustrate a subframe transmission scheme in normal transmission mode. Referring to FIG. 9, every data is transmitted on a subframe basis in the normal transmission mode. Upon generation of errors in data of a specific PUSCH, the UE may re-transmit the same data eight Transmission Time Intervals (TTIs) later, that is, 8 ms later in FIG. 9.

Referring to FIG. 10, 8 Hybrid Automatic Repeat request (HARQ) processes are operated at intervals of 8 subframes in normal transmission mode. From the perspective of one HARQ process, when a UE receives a PUSCH scheduling grant signal on a PDCCH at $n-4^{th}$ subframe, the UE transmits a PUSCH at $n^{th}$ subframe. In addition, the UE receives an ACK/NACK for the transmitted PUSCH at $n+4_{th}$ subframe. If the UE receives NACK at $n+4_{th}$ subframe, the UE performs retransmission at $n+8^{th}$ subframe.

Figure 11:
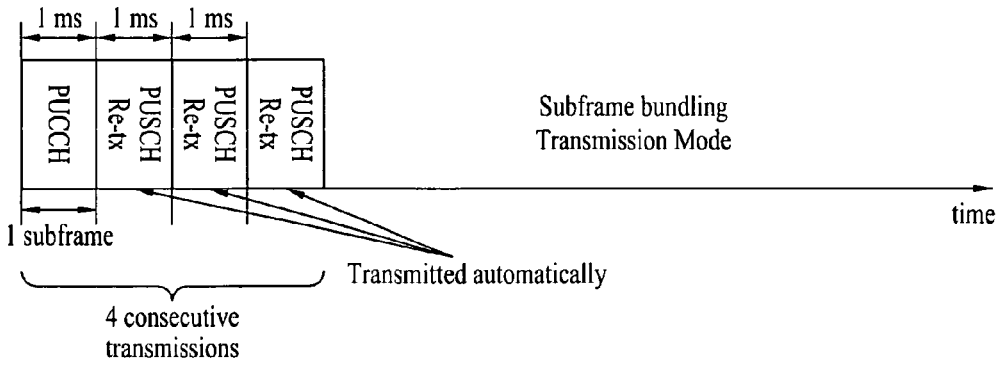
FIGS. 11 to 13 illustrate a subframe transmission scheme in subframe bundling transmission mode.
Figure 12:
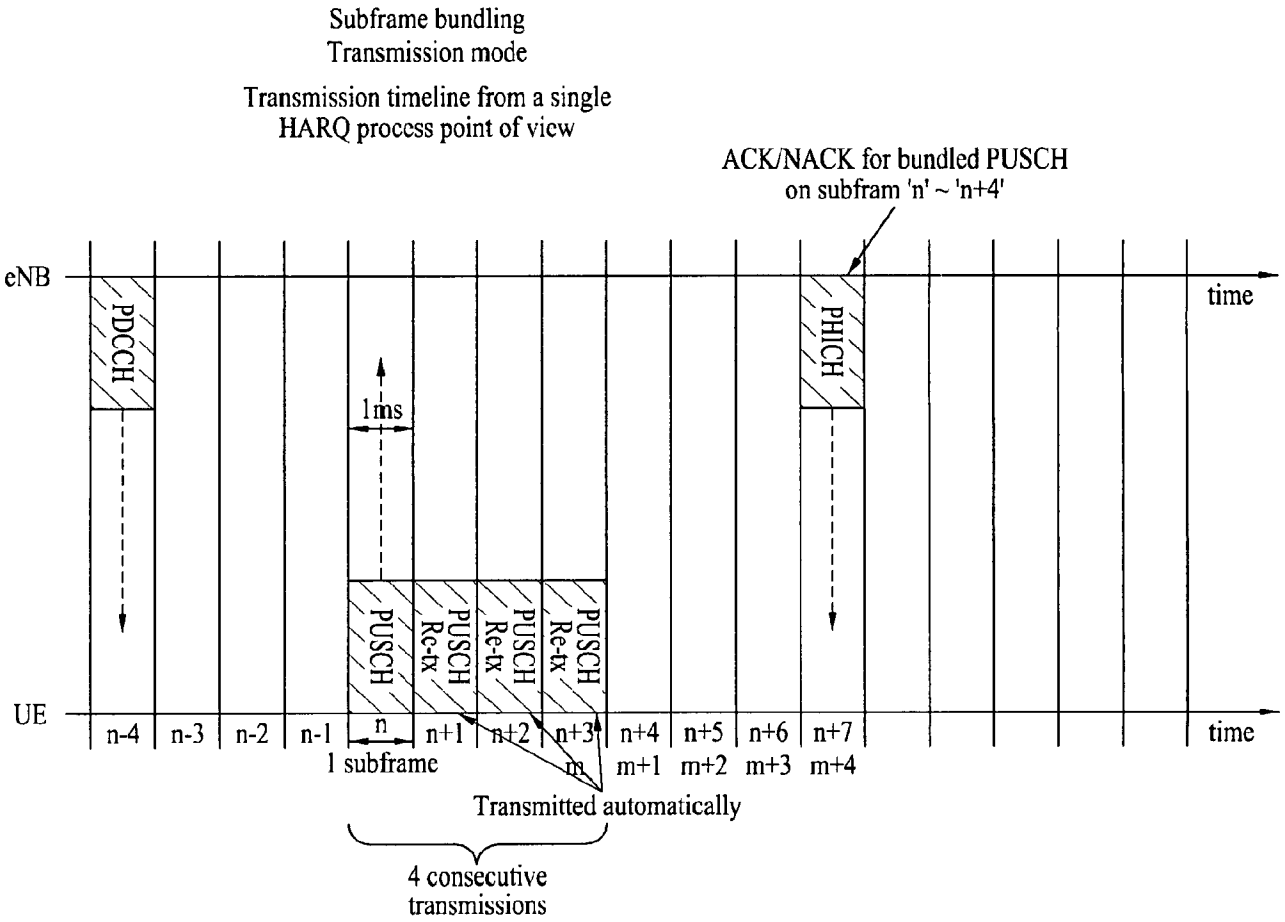
Figure 13:
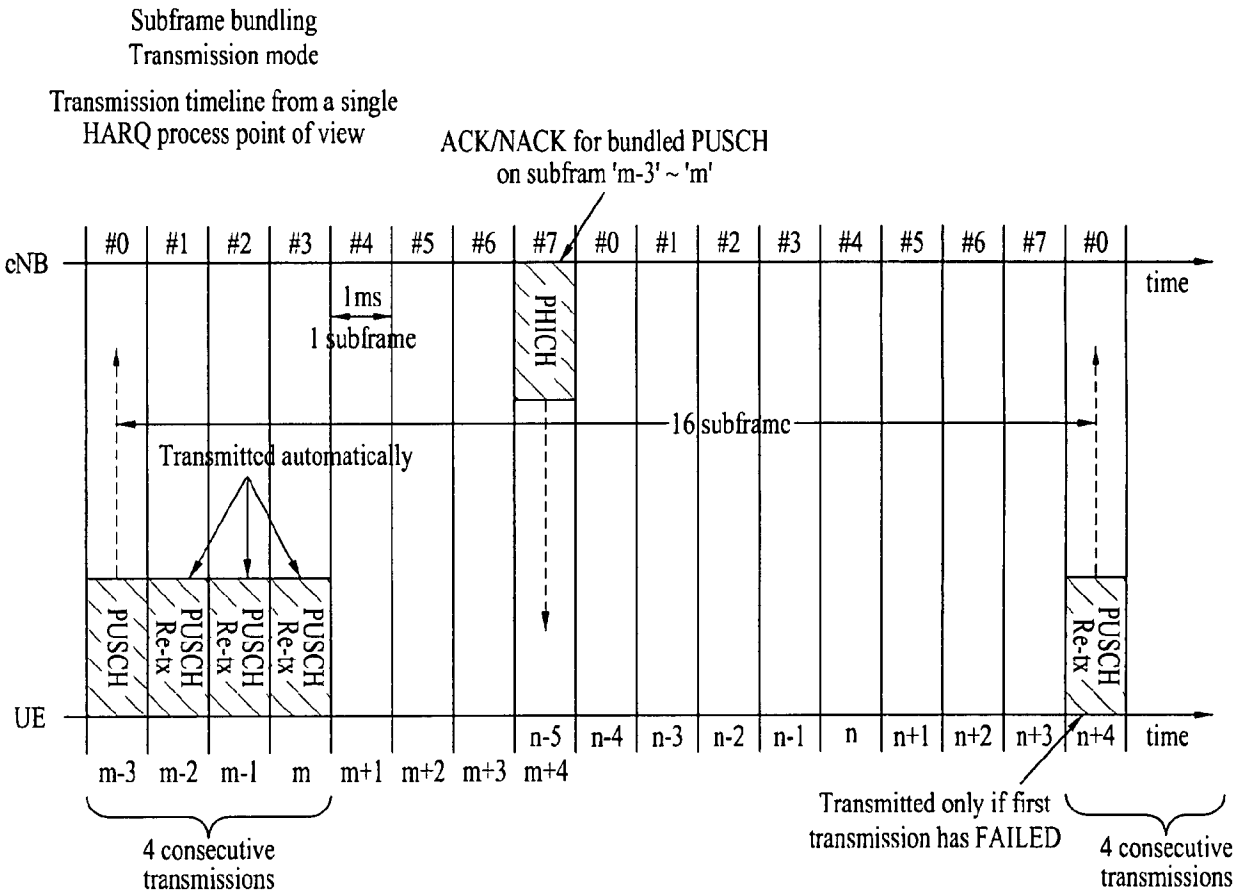

FIGS. 11 to 13 illustrate a subframe transmission scheme in the subframe bundling transmission mode. When the UE is remote from the eNB or the status of a radio link is poor, the eNB may set the UE to operate in the subframe bundling transmission mode. Referring to FIG. 11, the UE transmits data in a predetermined number of consecutive subframes in the subframe bundling transmission mode.

Referring to FIG. 12, 4 HARQ processes are operated at intervals of 16 subframes in subframe bundling transmission mode. From the perspective of one HARQ process, if a UE receives PUSCH scheduling grant signal on a PDCCH at $n-4^{th}$ subframe, the UE transmits PUSCH at $n^{th}$ subframe. In addition, the UE performs retransmission at n+1, n+2 and $n+3^{th}$ subframe right next to $n^{th}$ subframe. The UE receives an ACK/NACK for the transmission of the 4 consecutive PUSCHs at $n+7^{th}$ subframe (if last retransmission of PUSCH is at $m^{th}$ subframe, the UE receives an ACK/NACK for the transmission of the 4 consecutive PUSCHs at $m+4^{th}$ subframe).

Referring to FIG. 13, if the UE receives NACK at $n-5^{th}$ subframe, the UE performs retransmission on 4 consecutive subframes including $n+4^{th}$ subframe. The reason why the UE having received ACK/NACK does not performing retransmission after 4 subframes is for performing retransmission at intervals of 16 subframes from the initial PUSCH transmission.

From the perspective of one subframe among the temporally consecutive subframes (e.g. 4 consecutive subframes), data is transmitted on a PUSCH as in the normal transmission mode. The subframe bundling transmission mode is identical to the normal transmission mode in that each of the four subframes has the same configuration as a subframe that is transmitted in the normal transmission mode, except that the four consecutive subframes are transmitted in the subframe bundling transmission mode.

Therefore, there is no difference between the subframe bundling transmission mode and the normal transmission mode from the view of a physical layer. Their difference lies in that a transmission signal is transmitted on a subframe basis in the normal transmission mode, whereas a transmission signal is transmitted four consecutive times in the subframe bundling transmission mode.

Embodiment 1

A description will be made of a method for processing control information, when data transmission and transmission of periodic control information are simultaneous, in the case where the data is transmitted on a PUSCH by subframe bundling.

If the UE is set to the subframe bundling transmission mode, it transmits four consecutive frames on the PUSCH. The transmission of the four consecutive subframes on the PUSCH is highly probable to be concurrent with transmission of periodic control information on a PUCCH. Considering that the reason for the subframe bundling is poor data performance, there is a high probability that multiplexing the periodic control information with the data and transmitting the multiplexed signal on the PUSCH further degrade data performance.

Figure 14:
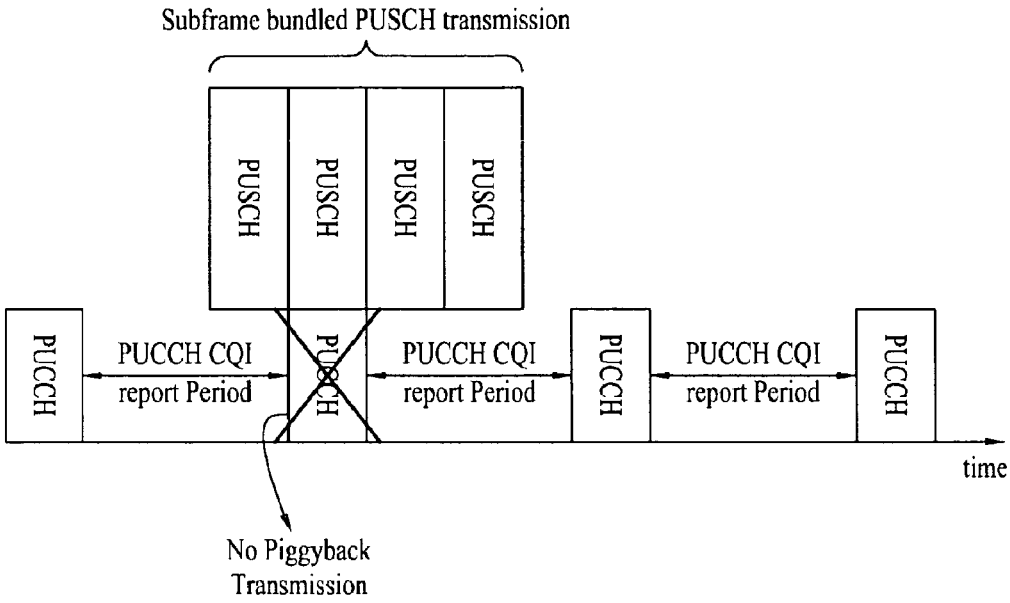
FIG. 14 illustrates a method for transmitting periodic control information in a UE that is operating in the subframe bundling transmission mode according to the present invention.

FIG. 14 illustrates a method for transmitting periodic control information in a UE that is operating in the subframe bundling transmission mode according to the present invention. Referring to FIG. 14, when data transmission on a PUSCH is concurrent with transmission of periodic control information on a PUCCH, the UE operating in the subframe bundling transmission mode transmits only the data on the PUSCH, dropping the transmission of the periodic control information on the PUCCH because multiplexing of the periodic control information and the data and transmission of the multiplexed signal on the PUSCH may degrade data performance, in accordance with the present invention. Therefore, the degradation of data performance may be prevented.

On the other hand, when data transmission on a PUSCH is concurrent with transmission of ACK/NACK information on a PUSCCH, dropping the ACK/NACK information transmission by the UE operating in the subframe bundling transmission mode may cause the transmission delay of a TB when downlink data is retransmitted.

Therefore, even though the UE is operating in the subframe bundling transmission mode, it is preferable to ensure the ACK/NACK information transmission. In accordance with an exemplary embodiment of the present invention, when the UE is operating in the subframe bundling transmission mode, the ACK/NACK information is transmitted over entire SC-FDMA symbols. More specifically, when the UE is operating in the subframe bundling transmission mode, it may insert the ACK/NACK information in the SC-FDMA symbols of a four-subframe bundle by puncturing and transmit the resulting subframe bundle on a PUSCH on the uplink.

Embodiment 2

A description will be made of a method for processing control information, when data transmission and transmission of non-periodic control information are simultaneous, in the case where the data is transmitted on a PUSCH by subframe bundling.

In the subframe bundling transmission mode, if the TB size of data to be transmitted on a PUSCH is non-zero and transmission of the data is concurrent with transmission of non-periodic control information, the UE may not transmit the non-periodic control information on the uplink, determining that an uplink scheduling grant signal received from the eNB is not valid, even though the eNB approves the transmission of the non-periodic control information by the uplink scheduling grant.

On the other hand, in the subframe bundling transmission mode, if the TB size of data to be transmitted on a PUSCH is zero and transmission of the data is concurrent with transmission of non-periodic control information, the following two methods may be considered regarding transmission of the non-periodic control information.

One of the methods is to prohibit the transmission of the non-periodic control information.

The other is to transmit the non-periodic control information on the PUSCH in one subframe despite the subframe bundling transmission mode of the UE, or to transmit the non-periodic control information on the PUSCH in as many subframes as subframes bundled for data transmission.

Figure 15:
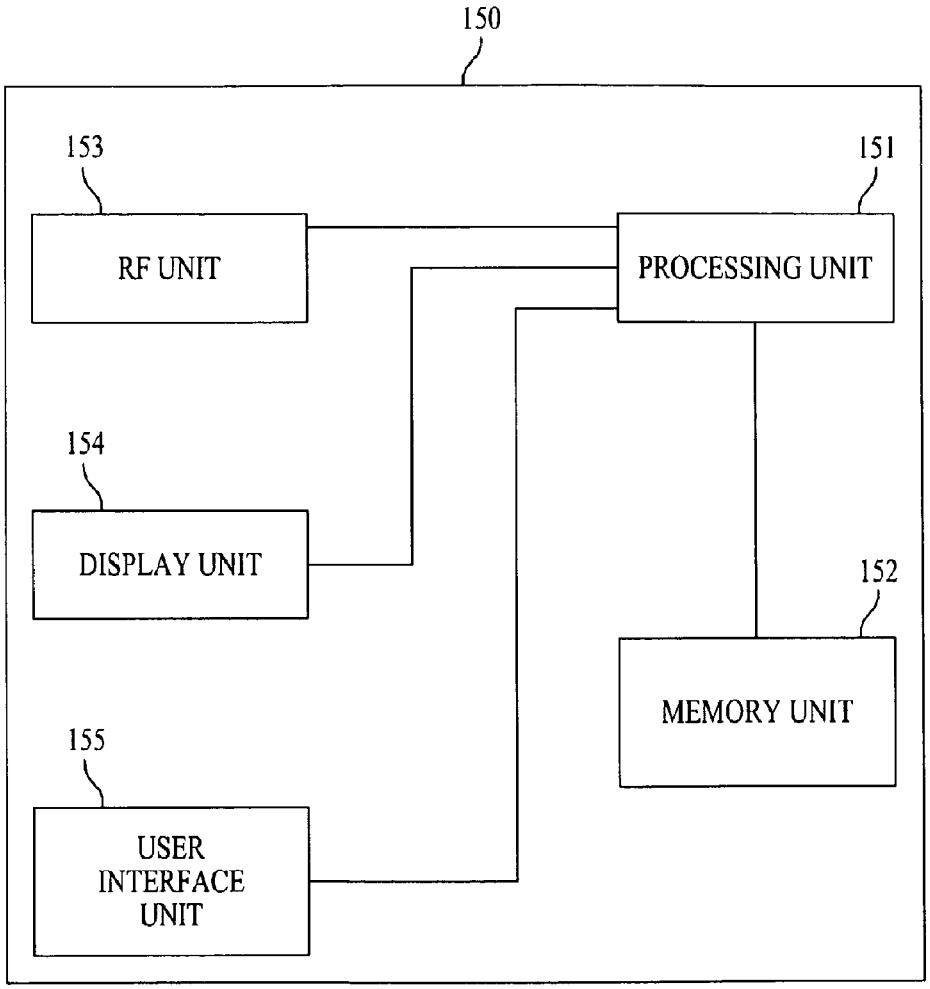
FIG. 15 is a block diagram of an apparatus for performing the above-described methods, which is applicable to a UE.

FIG. 15 is a block diagram of an apparatus for performing the above-described methods, which is applicable to a UE. Referring to FIG. 15, an apparatus 150 includes a processing unit 151, a memory unit 152, a Radio Frequency (RF) unit 153, a display unit 154, and a user interface unit 155. The processing unit 151 handles physical interface protocol layers. The processing unit 151 provides a control plane and a user plane. The processing unit 151 may perform functions of each layer. The memory unit 152, which is electrically connected to the processor 151, stores an operating system, application programs, and general files. If the apparatus 150 is a UE, the display unit 154 may display various pieces of information and be configured with a Liquid Crystal Display (LCD), an Organic Light Emitting Diode (OLED), etc. which are known in the art. The user interface unit 85 may be configured to be combined with a known user interface such as a keypad, a touch screen, or the like. The RF unit 83, which is electrically connected to the processor 81, transmits and receives radio signals.

As is apparent from the above description, the exemplary embodiments of the present invention maintain single-carrier characteristics, even though transmission of control information is concurrent with data transmission in a UE.

Also, when transmission of control information is concurrent with subframe bundling-based data transmission in a UE, data performance is ensured and the transmission delay of data is prevented by the above-described methods for processing control information according to the exemplary embodiments of the present invention.

The exemplary embodiments of the present invention are applicable to other systems requiring uplink transmission of data, a control signal, and an ACK/NACK signal as well as to the 3GPP LTE system.

In the exemplary embodiments of the present invention, a description is made of a data transmission and reception relationship between an eNB and a UE. Herein, a specific operation described as performed by the eNB may be performed by an upper node of the eNB.

Namely, it is apparent that, in a network comprised of a plurality of network nodes including an eNB, various operations performed for communication with a UE may be performed by the eNB, or network nodes other than the eNB. The term 'eNB' may be replaced with the term 'fixed station', 'Node B', 'access point', etc. The term 'UE' may be replaced with the term 'Mobile Station (MS)', 'Subscriber Station (SS)', 'Mobile Subscriber Station' (MSS), 'Mobile Terminal', etc.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, etc.

The exemplary embodiments of the present invention may be achieved by various means, for example, hardware, firmware, software, or a combination thereof.

In a hardware configuration, a method for transmitting an uplink signal according to exemplary embodiments of the present invention may be achieved by one or more Application Specific Integrated Circuits (ASICS), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, a method for transmitting an uplink signal according to the exemplary embodiments of the present invention may be implemented in the form of a module, a procedure, a function, etc. performing the above-described functions or operations. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for transmitting*, by a user equipment,* uplink signals, the method comprising:

transmitting[, by a user equipment,] *first* periodic control information on a [Physical Uplink Control Channel] *physical uplink control channel* (PUCCH) [at a predetermined period] *when there is no uplink data to be transmitted at a time for transmission of the first periodic control information*; and

*dropping second periodic control information and transmitting first uplink data on a first physical uplink shared channel* (*PUSCH*) *when a time for transmission of the first uplink data collides with a time for transmission of the second periodic control information and* when the user equipment operates in subframe bundling transmission mode [where uplink data is transmitted using a predetermined number of consecutive subframes and when a time for transmission of the periodic control information collides with a time for transmission of the uplink data, dropping the transmission of the periodic control information and transmitting the uplink data except the periodic control information on a Physical Uplink Shared Channel (PUSCH),] *in which a plurality of subframes are used for uplink data transmission, and* wherein [the] *each of the first and second* periodic control information includes at least one of a channel quality indication (CQI), a precoding matrix index (PMI), and a rank indication (RI).

[2. The method of claim 1, wherein the predetermined number of consecutive subframes are 4 consecutive subframes along a time axis.]

3. A user equipment [of transmitting] *to transmit* uplink signals, the user equipment comprising:

a Radio Frequency (RF) unit; *and* a processing unit operably connected to the RF unit[; and a memory unit operably connected to the processing unit], wherein the processing unit is configured to*:* control the RF unit to transmit [a] *first* periodic control information [through the RF unit] on a [Physical Uplink Control Channel] *physical uplink control channel* (PUCCH) [at a predetermined period;] *when there is no uplink data to be transmitted at a time for transmission of the first periodic control information,*

*drop second periodic control information and control the RF unit to transmit first uplink data on a first physical uplink shared channel* (*PUSCH*) *when a time for transmission of the first uplink data collides with a time for transmission of the second periodic control information and* when the user equipment operates in subframe bundling transmission mode [where a uplink data is transmitted using a predetermined number of consecutive subframes and when a time for transmission of the periodic control information collides with a time for transmission of the uplink data, the processing unit is configured to drop the periodic control information and to control the RF unit to transmit the uplink data except the periodic control information on a Physical Uplink Shared Channel (PUSCH),] *in which a plurality of subframes are used for uplink data transmission, and* wherein [the] *each of the first and second* periodic control information includes at least one of a channel quality indication (CQI), a precoding matrix index (PMI), and a rank indication (RI).

[4. The user equipment of claim 3, wherein the predetermined number of consecutive subframes are 4 consecutive subframes along a time axis.]

*5. The method of claim 1, further comprising:*

*transmitting acknowledgement/negative acknowledgement (ACK/NACK) information together with second uplink data on a second PUSCH when a time for transmission of the second uplink data collides with a time for transmission of the ACK/NACK control information and when the user equipment operates in the subframe bundling transmission mode.*

*6. The user equipment of claim 3, wherein the processing unit is configured to control the RF unit to further transmit acknowledgement/negative acknowledgement (ACK/NACK) information together with second uplink data on a second PUSCH when a time for transmission of the second uplink data collides with a time for transmission of the ACK/NACK control information and when the user equipment operates in the subframe bundling transmission mode.*

*7. A method for receiving, by a base station, uplink signals, comprising:*

*receiving first periodic control information on a physical uplink control channel (PUCCH) from a user equipment when there is no uplink data to be received from the user equipment at a time for reception of the first periodic control information; and*

*receiving first uplink data without second periodic control information on a first physical uplink shared channel (PUSCH) when a time for reception of the first uplink data collides with a time for reception of the second periodic control information and when the user equipment operates in subframe bundling transmission mode in which a plurality of subframes are used for uplink data reception,*

*wherein each of the first and second periodic control information includes at least one of a channel quality indication (CQI), a precoding matrix index (PMI) and a rank indication (RI).*

*8. The method of claim 7, further comprising:*

*receiving acknowledgement/negative acknowledgement (ACK/NACK) information together with second uplink data on a second PUSCH when a time for reception of the second uplink data collides with a time for reception of the ACK/NACK control information and when the user equipment operates in the subframe bundling transmission mode.*

*9. A base station for receiving uplink signals, comprising:*

*a radio frequency (RF) unit; and*

*a processing unit operably connected to the RF unit, wherein the processing unit is configured to:*

*control the RF unit to receive first periodic control information on a physical uplink control channel (PUCCH) from a user equipment when there is no uplink data to be received from the user equipment at a time for reception of the first periodic control information; and*

*control the RF unit to receive first uplink data without second periodic control information on a first physical uplink shared channel (PUSCH) when a time for reception of the first uplink data collides with a time for reception of the second periodic control information and when the user equipment operates in subframe bundling transmission mode in which a plurality of subframes are used for uplink data reception,*

*wherein each of the first and second periodic control information includes at least one of a channel quality indication (CQI), a precoding matrix index (PMI) and a rank indication (RI).*

*10. The base station of claim 9 wherein the processing unit is configured to control the RF unit to further receive acknowledgement/negative acknowledgement (ACK/NACK) information together with second uplink data on a second PUSCH when a time for reception of the second uplink data collides with a time for reception of the ACK/NACK control information and when the user equipment operates in the subframe bundling transmission mode.*

* * * * *